(12) United States Patent
Tsunoda

(10) Patent No.: US 8,110,318 B2
(45) Date of Patent: Feb. 7, 2012

(54) SOLID OXIDE FUEL CELL WITH REFORMING CHAMBER INTEGRATED WITHIN SEPARATOR PLATES

(75) Inventor: Tadashi Tsunoda, Nerima-ku (JP)

(73) Assignee: Honda Motor Co., Ltd., Tokyo (JP)

( * ) Notice: Subject to any disclaimer, the term of this patent is extended or adjusted under 35 U.S.C. 154(b) by 1258 days.

(21) Appl. No.: 11/794,329

(22) PCT Filed: Dec. 28, 2005

(86) PCT No.: PCT/JP2005/024258
§ 371 (c)(1),
(2), (4) Date: Jun. 27, 2007

(87) PCT Pub. No.: WO2006/070932
PCT Pub. Date: Jul. 6, 2006

(65) Prior Publication Data
US 2007/0269706 A1   Nov. 22, 2007

(30) Foreign Application Priority Data

Dec. 28, 2004   (JP) .................. 2004-379683

(51) Int. Cl.
*H01M 8/02* (2006.01)
*H01M 8/06* (2006.01)
*H01M 8/24* (2006.01)
*H01M 8/12* (2006.01)

(52) U.S. Cl. ........ 429/514; 429/457; 429/443; 429/456; 429/515

(58) Field of Classification Search .................. None
See application file for complete search history.

(56) References Cited

U.S. PATENT DOCUMENTS

| 5,077,148 A | * | 12/1991 | Schora et al. ............. 429/425 |
| 5,212,022 A | | 5/1993 | Takahashi et al. |
| 6,569,554 B1 | | 5/2003 | Doggwiler et al. |
| 2004/0053108 A1 | * | 3/2004 | Tsunoda .................. 429/38 |

FOREIGN PATENT DOCUMENTS

| EP | 0521830 A1 | * | 1/1993 |
| EP | 0521830 B1 | | 1/1993 |
| EP | 1075033 | | 2/2001 |
| JP | 02-155170 | | 6/1990 |

(Continued)

OTHER PUBLICATIONS

Japanese Office Action for Application No. 2004-379683, dated Nov. 24, 2009.

*Primary Examiner* — Barbara Gilliam
*Assistant Examiner* — Angela Martin
(74) *Attorney, Agent, or Firm* — Nelson Mullins Riley & Scarborough LLP; Anthony A. Laurentano

(57) ABSTRACT

A fuel cell includes an electrolyte electrode assembly and a pair of separators sandwiching the electrolyte electrode assembly. The separator includes first to third plates. A fuel gas channel is formed between the first and third plates. The fuel gas channel forms a fuel gas pressure chamber over an electrode surface of an anode. The fuel gas pressure chamber is divided into an inner pressure chamber and an outer pressure chamber an arc-shaped wall. Reforming catalyst is provided in the outer pressure chamber.

7 Claims, 14 Drawing Sheets

FOREIGN PATENT DOCUMENTS

| | | |
|---|---|---|
| JP | 6-163063 | 6/1994 |
| JP | 8-31322 | 3/1996 |
| JP | 2001-52724 | 2/2001 |
| JP | 2003-317785 | 11/2003 |
| JP | 2004-200022 | 7/2004 |
| JP | 2005/060029 A2 | 6/2005 |
| WO | WO-2005/060029 A2 | 6/2005 |

* cited by examiner

---→ FUEL GAS
—→ OXYGEN-CONTAINING GAS

US 8,110,318 B2

SOLID OXIDE FUEL CELL WITH REFORMING CHAMBER INTEGRATED WITHIN SEPARATOR PLATES

RELATED APPLICATIONS

This application is a 35 U.S.C. 371 national stage filing of International Application No. PCT/JP2005/024258, filed 28 Dec. 2005, which claims priority to Japanese Patent Application No. 2004-379683 filed on 28 Dec. 2004 in Japan. The contents of the aforementioned applications are hereby incorporated by reference.

TECHNICAL FIELD

The present invention relates to a fuel cell formed by sandwiching an electrolyte electrode assembly between separators. The electrolyte electrode assembly includes an anode, a cathode, and an electrolyte interposed between the anode and the cathode. Further, the present invention relates to a fuel cell stack formed by stacking a plurality of the fuel cells.

BACKGROUND ART

Typically, a solid oxide fuel cell (SOFC) employs an electrolyte of ion-conductive solid oxide such as stabilized zirconia. The electrolyte is interposed between an anode and a cathode to form an electrolyte electrode assembly (unit cell). The electrolyte electrode assembly is interposed between separators (bipolar plates). In use, normally, a predetermined numbers of the unit cells and the separators are stacked together to form a fuel cell stack.

In the fuel cell, a gas chiefly containing oxygen or the air (hereinafter also referred to as the "oxygen-containing gas") is supplied to the cathode. The oxygen in the oxygen-containing gas is ionized at the interface between the cathode and the electrolyte, and the oxygen ions ($O^{2-}$) move toward the anode through the electrolyte. A fuel gas such as a gas chiefly containing hydrogen (hereinafter also referred to as the "hydrogen-containing gas") or CO is supplied to the anode. The oxygen ions react with the hydrogen in the hydrogen-containing gas to produce water or react with CO to produce $CO_2$. Electrons released in the reaction flow through an external circuit to the cathode, creating DC electric energy.

Power generation reaction ($H_2 + \frac{1}{2}O_2 \rightarrow H_2O$) of the solid oxide fuel cell is exothermic reaction. Therefore, the temperature of the solid oxide fuel cell is significantly high. Fuel reforming reaction (e.g., in the case of methane, $CH_4 + 2H_2O \rightarrow CO_2 + 4H_2$) in steam reforming of hydrocarbon by a reformer is endothermic reaction. Therefore, it is desirable to substantially match the heat generation distribution in the power generation reaction in the cell and heat absorption distribution by steam reforming reaction. In this regard, for example, a solid oxide fuel cell disclosed in Japanese Laid-Open Patent Publication No. 2003-317785 is known.

In the conventional technique, as shown in FIG. 14, a solid oxide fuel cell 3 is formed by stacking reformers 1 and cells 2 alternately. The reformers 1 perform steam reforming by supplying a hydrocarbon fuel gas to reforming catalyst such as nickel-based catalyst. Each of the cells 2 includes a fuel electrode 2A, an air electrode 2C, and an electrolyte layer 2B interposed between the fuel electrode 2A and the air electrode 2C.

Each of the reformers 1 has hollow structure for forming a catalyst filling passage 4. That is, the reforming catalyst is filled in the hollow part of the reformer 1. Further, a fuel electrode side passage 5 as a passage of a reforming gas is formed on the upper surface of the reformer 1, and an air electrode side passage 6 is formed on the lower surface of the reformer 1.

A reforming gas inlet 5a of the fuel electrode side passage 5 is provided adjacent to a hydrocarbon fuel gas inlet 4a of the catalyst filling passage 4. A reforming gas outlet 4b of the catalyst filling passage 4 is connected to the reforming gas inlet 5a of the fuel electrode side passage 5 through a return passage 7.

In the conventional technique, the reformers 1 and the cells 2 are stacked together. The catalyst filling passage 4 and the fuel electrode side passage 5 are provided adjacent to each other. In the structure, the reforming gas outlet 4b of the catalyst filling passage 4 and the reforming gas inlet 5a of the fuel electrode side passage 5 are connected through the return passage 7. Thus, the solid oxide fuel cell 3 has complicated structure. The overall width of the solid oxide fuel cell 3 is significantly large.

DISCLOSURE OF INVENTION

A main object of the present invention is to provide a fuel cell and a fuel cell stack having simple and compact structure in which it is possible to perform internal reforming in a manner that the uniform temperature distribution is achieved.

The present invention relates to a fuel cell including an electrolyte electrode assembly and a pair of separators sandwiching the electrolyte electrode assembly. The electrolyte electrode assembly includes an anode, a cathode, and an electrolyte interposed between the anode and the cathode. Further, the present invention relates to a fuel cell stack including a plurality of the fuel cells stacked together in a stacking direction and end plates provided at opposite ends of the fuel cells in the stacking direction.

Each of the separators includes first and second plates which are stacked together. An oxygen-containing gas channel for supplying an oxygen-containing gas to the cathode, and a fuel gas channel for supplying a fuel gas to the anode are formed between the first and second plates.

The oxygen-containing gas channel forms an oxygen-containing gas pressure chamber over an electrode surface of the cathode such that the second plate is interposed between the oxygen-containing gas pressure chamber and the cathode. The fuel gas channel forms a fuel gas pressure chamber over an electrode surface of the anode such that the first plate is interposed between the fuel gas pressure chamber and the anode. The fuel gas pressure chamber is divided into a plurality of pressure chambers by partitions. Reforming catalyst for reforming a hydrocarbon fuel before consumption to produce a fuel gas is provided in at least one of the divided pressure chambers. Specifically, the reforming catalyst may be in the form of pellets. Alternatively, the reforming catalyst may coat the inside of the pressure chamber.

It is preferable that the first plate has a fuel gas inlet for supplying the fuel gas from the fuel gas pressure chamber to a central region of the anode, the fuel gas pressure chamber is divided into an inner pressure chamber connected to the fuel gas inlet and an outer pressure chamber formed around the inner pressure chamber, and the reforming catalyst is provided in the outer pressure chamber. In the structure, firstly, the fuel gas flows into the outer pressure chamber, and is reformed by the reforming catalyst. Then, the fuel gas flows through the inner pressure chamber, and is supplied to the central region of the anode through the fuel gas inlet.

Further, it is preferable that the partitions have a slit connecting the inner pressure chamber and the outer pressure chamber. Further, it is preferable that a plurality of slits are provided at predetermined intervals.

Further, it is preferable that the first and second plates include first and second protruding portions protruding in different directions, the first protruding portion include a plurality of protrusions in contact with an inner region of the anode and a substantially ring-shaped protrusion provided around the plurality of protrusions, and in contact with an outer region of the anode, and the outer pressure chamber is formed by the backside of the substantially ring-shaped protrusion and the partitions or the backside of the substantially ring-shaped protrusion, the partitions, and part of the backside of the plurality of protrusions.

Further, it is preferable that the first and second protruding portions function as a current collector for collecting electrical energy generated in the electrolyte electrode assembly. Further, it is preferable that a third plate for dividing the fuel gas channel and the oxygen-containing gas channel are provided between the first and second plates.

Further, it is preferable that a fuel gas distribution passage connecting a fuel gas supply passage and the fuel gas channel is formed between the first and third plates for supplying the fuel gas before consumption in the stacking direction of the electrolyte electrode assembly and the separators, and an oxygen-containing gas distribution passage connecting an oxygen-containing gas supply passage and the oxygen-containing gas channel is formed between the second and third plates for supplying the oxygen-containing gas before consumption in the stacking direction.

BEST MODE FOR CARRYING OUT THE INVENTION

Figure 1:
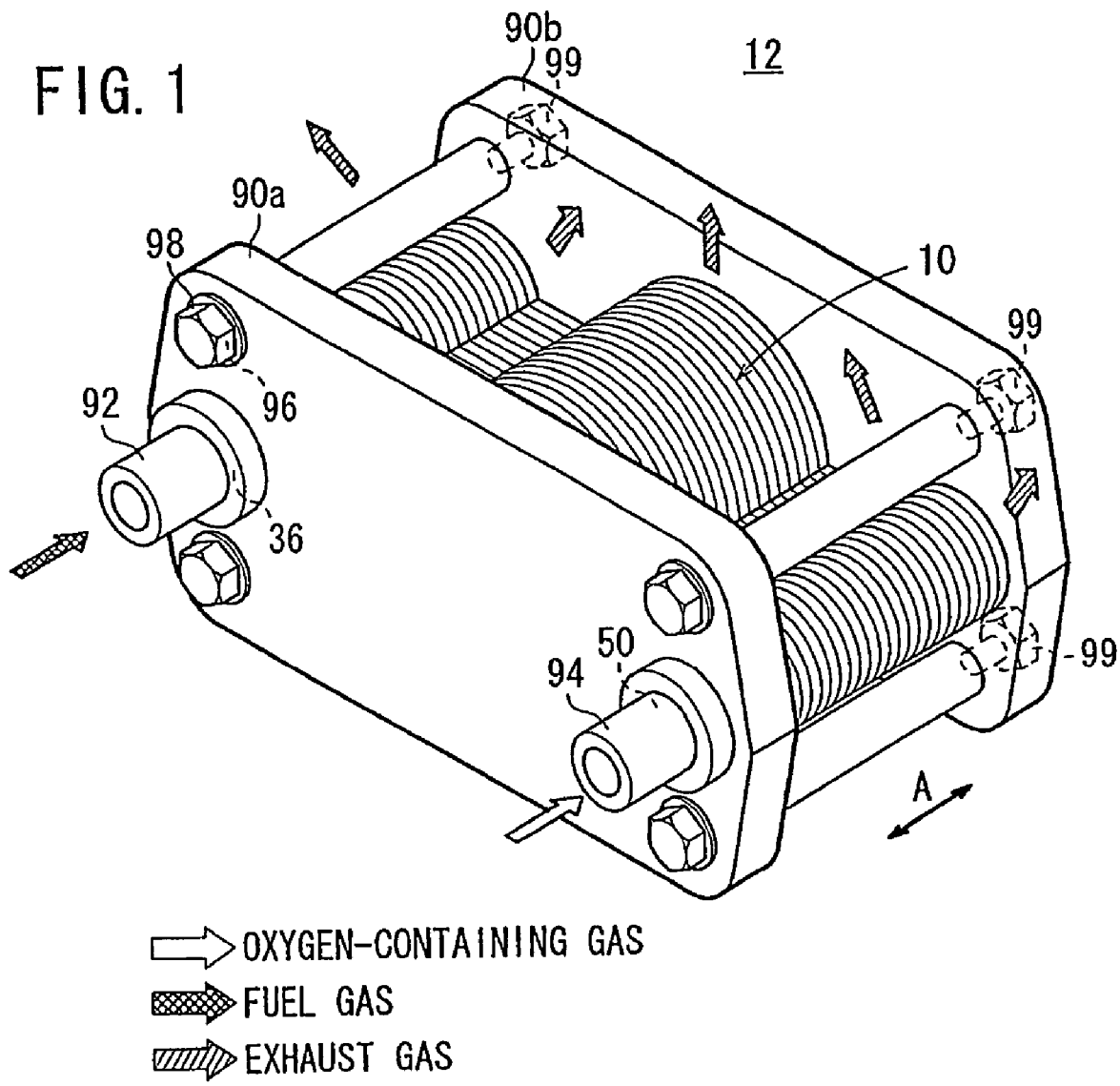
FIG. 1 is a perspective view schematically showing a fuel cell stack formed by stacking a plurality of fuel cells according to a first embodiment of the present invention.

FIG. 1 is a perspective view schematically showing a fuel cell stack 12 formed by stacking a plurality of fuel cells 10 according to a first embodiment of the present invention in the direction indicated by an arrow A.

Figure 2:
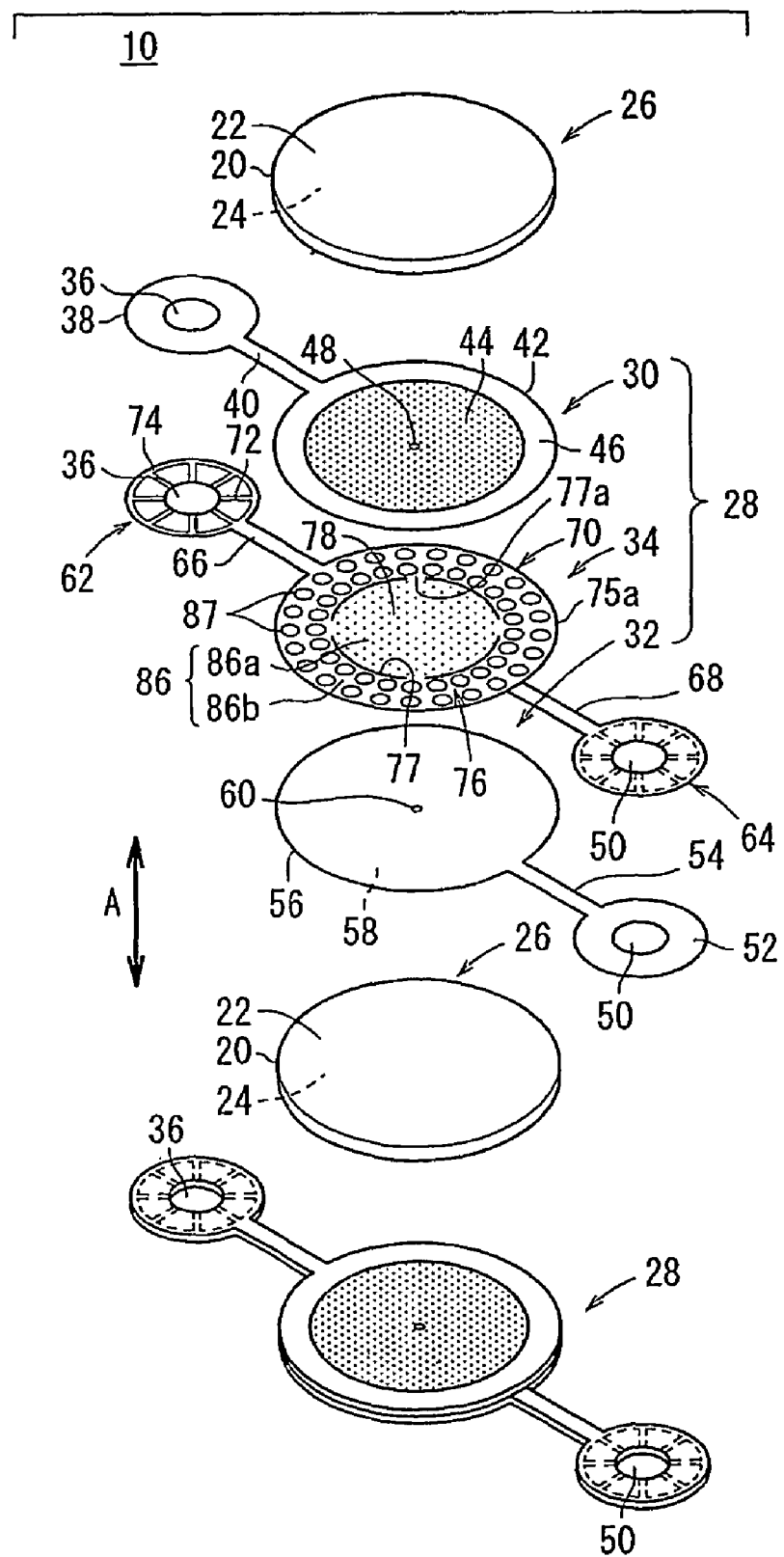
FIG. 2 is an exploded perspective view showing the fuel cell.
Figure 3:
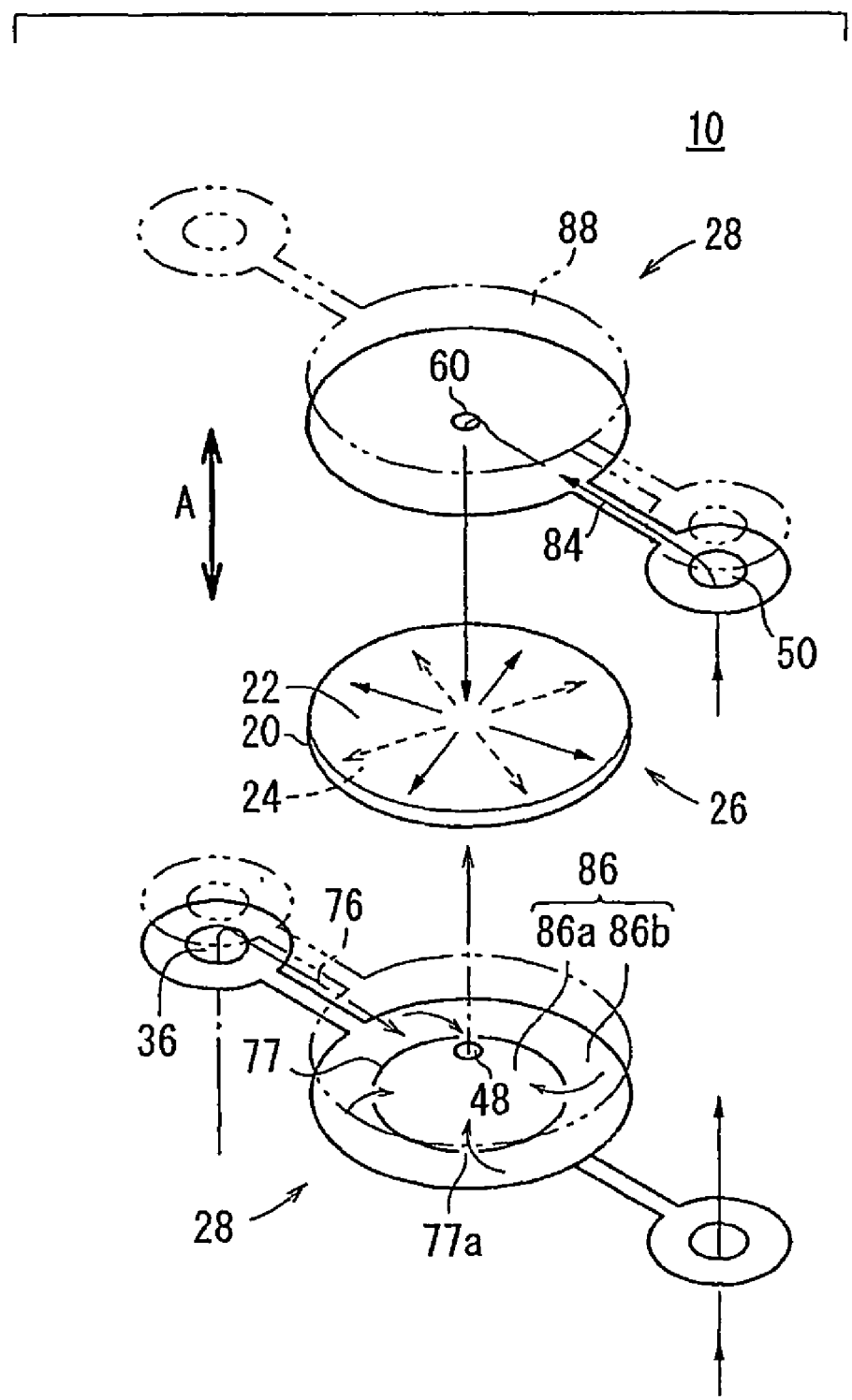
FIG. 3 is a partial exploded perspective view showing gas flows in the fuel cell.

The fuel cell 10 is a solid oxide fuel cell used in various applications, including stationary and mobile applications. For example, the fuel cell 10 is mounted on a vehicle. As shown in FIGS. 2 and 3, the fuel cell 10 includes an electrolyte electrode assembly 26. The electrolyte electrode assembly 26 includes a cathode 22, an anode 24, and an electrolyte (electrolyte plate) 20 interposed between the cathode 22 and the anode 24. For example, the electrolyte 20 is made of ion-conductive solid oxide such as stabilized zirconia. The electrolyte electrode assembly 26 has a circular disk shape.

The fuel cell 10 is formed by sandwiching the electrolyte electrode assembly 26 between a pair of separators 28. The separator 28 includes first and second plates 30, 32, and a third plate 34 interposed between the first and second plates 30, 32. For example, the first to third plates 30, 32, 34 are metal plates of, e.g., stainless alloy. The first plate 30 and the second plate 32 are joined to both surfaces of the third plate 34 by brazing, for example.

As shown in FIG. 2, the first plate 30 has a first small diameter end portion 38. A fuel gas supply passage 36 for supplying a fuel gas in the direction indicated by the arrow A extends through the first small diameter end portion 38. The first small diameter end portion 38 is integral with a first circular disk 42 having a relatively large diameter through a narrow bridge 40. The first circular disk 42 and the electrolyte electrode assembly 26 have substantially the same size.

A large number of first protrusions 44 are formed on a surface of the first circular disk 42 which contacts the anode 24, from a position near the outer circumferential region to the central position. A substantially ring shaped protrusion 46 is provided on the outer circumferential region of the first circular disk 42. The first protrusions 44 and the substantially ring shaped protrusion 46 jointly function as a current collector. The first protrusions 44 may be formed by making a plurality of recesses in a surface which is in the same plane with the surface of the substantially ring shaped protrusion 46.

A fuel gas inlet 48 is provided at the center of the first circular disk 42 for supplying the fuel gas toward substantially the central region of the anode 24.

The second plate 32 has a second small diameter end portion 52. An oxygen-containing gas supply passage 50 for supplying an oxygen-containing gas in the direction indicated by the arrow A extends through the second small diameter end portion 52. The second small diameter end portion 52 is integral with a second circular disk 56 having a relatively large diameter through a narrow bridge 54.

Figure 4:
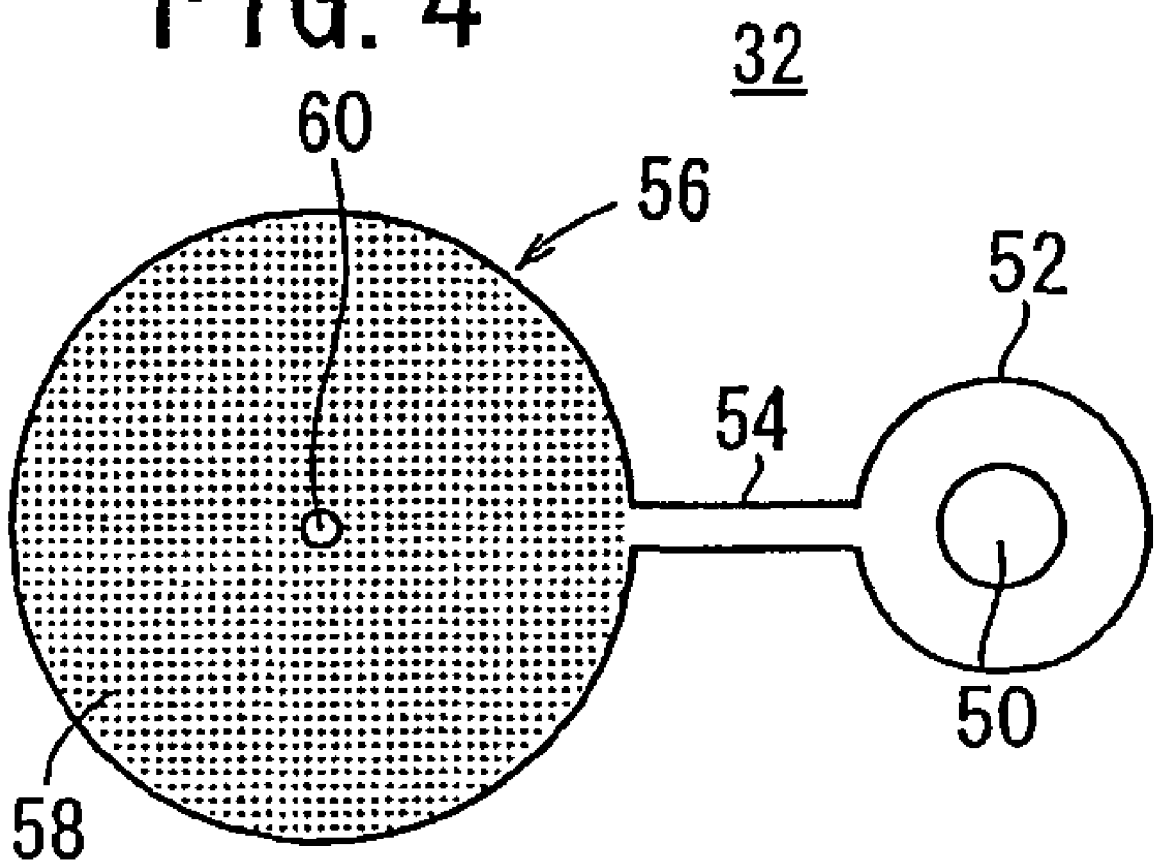
FIG. 4 is a front view showing a second plate of the fuel cell.

As shown in FIG. 4, a plurality of second protrusions 58 are formed on the entire surface of the second circular disk 56 which contacts the cathode 22 of the electrolyte electrode assembly 26. The second protrusions 58 function as a current collector. An oxygen-containing gas inlet 60 is provided at the center of the second circular disk 56 for supplying the oxygen-containing gas toward substantially the central region of the cathode 22.

As shown in FIG. 2, the third plate 34 includes a third small diameter end portion 62 and a fourth small diameter end portion 64. The fuel gas fuel passage 36 extends through the third small diameter end portion 62, and the oxygen-containing gas supply passage 50 extends through the fourth small diameter end portion 64. The third and fourth small diameter end portions 62, 64 are integral with a third circular disk 70 having a relatively large diameter through narrow bridges 66, 68, respectively. The first to third circular disks 42, 56, 70 have the same diameter.

Figure 5:
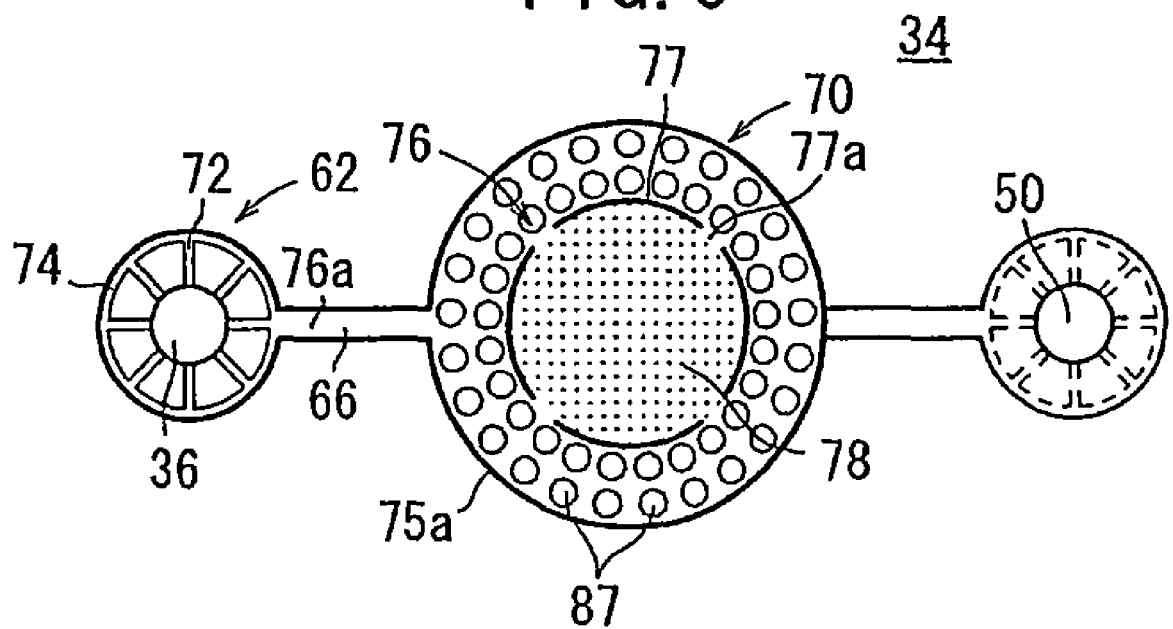
FIG. 5 is a view with partial omission showing one surface of a third plate of the fuel cell.

As shown in FIGS. 2 and 5, the third plate 34 has a plurality of slits 72 radially formed in the third small diameter end portion 62, on a surface facing the first plate 30. The slits 72 are connected to the fuel gas supply passage 36. Further, the slits 72 are connected to a recess 74 formed in an outer circumferential region of the third small diameter end portion 62.

Ridges 75a are provided along the outer edges of the third small diameter end portion 62, the bridge 66, and the third circular disk 70 such that a fuel gas channel 76 as described later is formed in the surfaces of the third small diameter end portion 62, the bridge 66, and the third circular disk 70. The fuel gas channel 76 is connected to the fuel gas supply passage 36 through the slits 72.

A plurality of, e.g., four arc-shaped walls (partitions) 77 are provided along a circle concentric with the center of the third circular disk 70. Slits 77a form predetermined gaps between the arc-shaped walls 77. As shown in FIG. 5, a predetermined circular arc-shaped wall 77 faces a fuel gas distribution passage 76a as described later. A plurality of third protrusions 78 are formed on the third circular disk 70 inside the arc-shaped walls 77.

Figure 6:
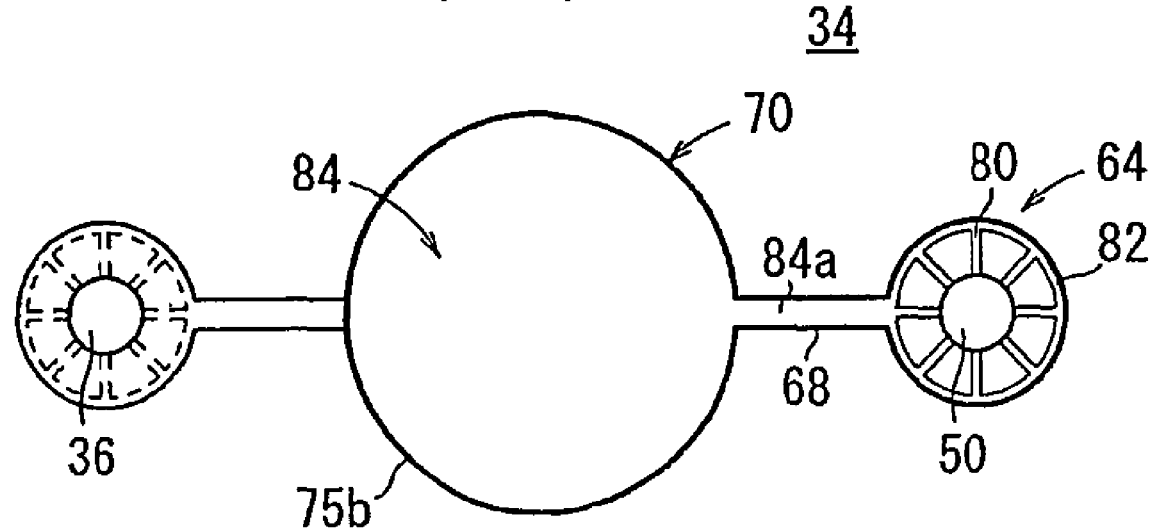
FIG. 6 is a view with partial omission showing the other surface of the third plate.

As shown in FIG. 6, the third plate 34 has a plurality of slits 80 radially formed in the fourth small diameter end portion 64, on a surface which contacts the second plate 32. The slits 80 are connected to the oxygen-containing gas supply passage 50. Further, the slits 80 are connected to a recess 82. The recess 82 prevents the entry of brazing material into slits 80, and into an area inside the recess 82.

Ridges 75b are provided along the outer edges of the fourth small diameter end portion 64, the bridge 68, and the third circular disk 70 such that an oxygen-containing gas channel 84 as described later is formed in the surfaces of the fourth small diameter end portion 64, the bridge 68, and the third circular disk 70. The oxygen-containing gas channel 84 is connected to the oxygen-containing gas supply passage 50 through the slits 80.

The first plate 30 is joined to one surface of the third plate 34 by brazing to form the fuel gas channel 76 connected to the fuel gas supply passage 36 between the first and third plates 30, 34. The bridge 40 of the first plate 30 and the bridge 66 of the third plate 34 are joined together to form a fuel gas channel member, and a fuel gas distribution passage 76a as part of the fuel gas channel 76 is formed in the fuel gas channel member (see FIG. 7).

The fuel gas channel 76 forms a fuel gas pressure chamber 86 between the first and third circular disks 42, 70, over the electrode surface of the anode 24. The first circular disk 42 is provided between the fuel gas pressure chamber 86 and the anode 24. That is, when the fuel gas is supplied to the fuel gas pressure chamber 86, the first circular disk 42 tightly contacts the anode 24 under pressure (see FIGS. 7 and 8). The fuel gas pressure chamber 86 is divided into a plurality of pressure chambers, e.g., an inner pressure chamber 86a and an outer pressure chamber 86b by the arc-shaped walls (partitions) 77. In the embodiment shown in FIG. 9, the outer pressure chamber 86b is formed by the backside of the substantially ring-shaped protrusion 46, the arc-shaped walls (partitions) 77, and part of the backside of the first protrusions 44. Alternatively, the outer pressure chamber 86b may be formed only by the backside of the substantially ring-shaped protrusion 46 and the arc-shaped walls (partitions) 77.

The inner pressure chamber 86a is connected to the fuel gas inlet 48. Pieces of reforming catalyst 87 such as nickel-based catalyst are provided in the outer pressure chamber 86b around the inner pressure chamber 86a. For example, the reforming catalyst 87 is in the form of pellets. However, the present invention is not limited in this respect. As long as the reforming catalyst 87 can fill the outer pressure chamber 86b, the reforming catalyst 87 may be in any form. Further, the reforming catalyst 87 may be coated on the third circular disk 70 in the area corresponding to the outer pressure chamber 86b.

Figure 8:
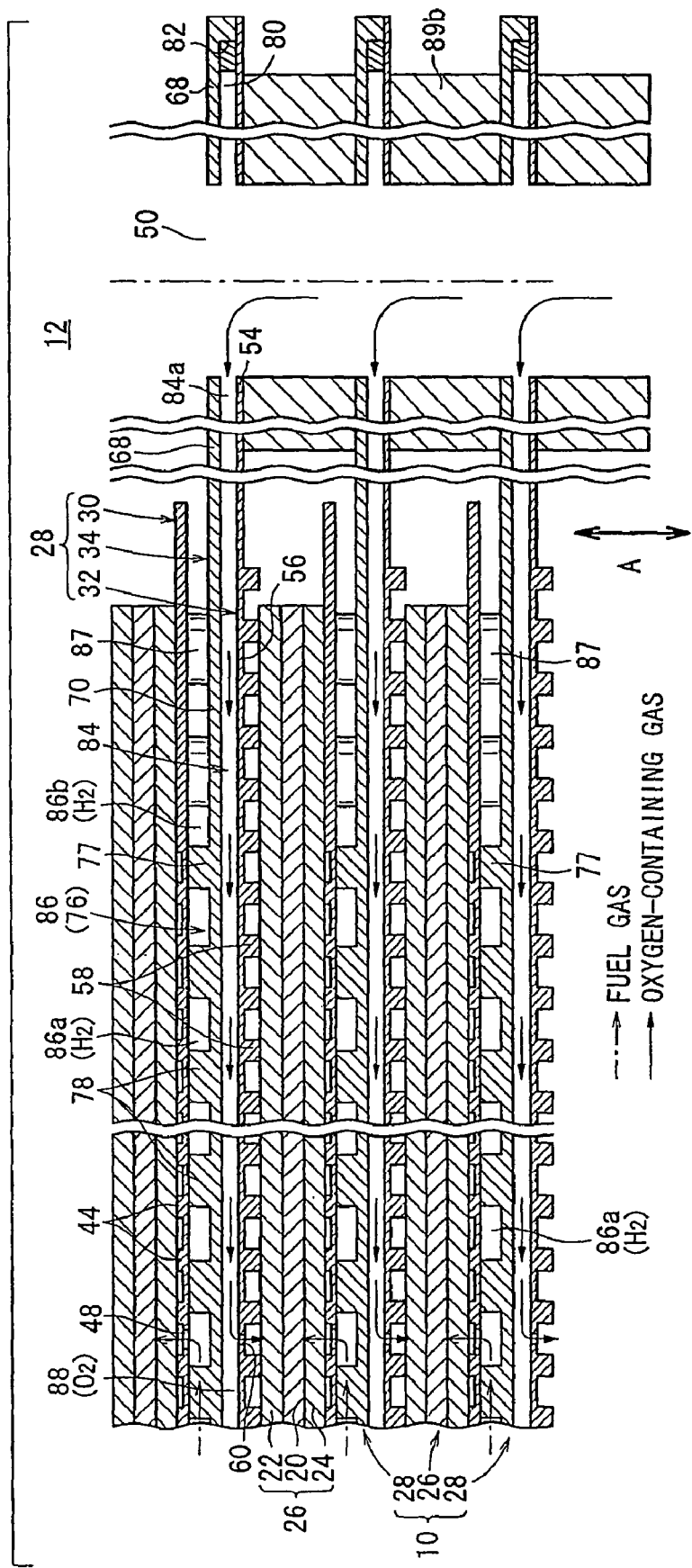
FIG. 8 is an enlarged cross sectional view showing the fuel cells at a position near an oxygen-containing gas supply passage.

The second plate 32 is joined to the third plate 34 by brazing to form an oxygen-containing gas channel 84 connected to the oxygen-containing gas supply passage 50 between the second and third plates 32, 34 (see FIG. 8). The bridge 54 of the second plate 32 and the bridge 68 of the third plate 34 are joined together to form an oxygen-containing gas channel member, and an oxygen-containing gas distribution passage 84a as part of the oxygen-containing gas channel 84 is formed in the oxygen-containing gas channel member.

The oxygen-containing gas channel 84 forms an oxygen-containing gas pressure chamber 88 between the second and third circular disks 56, 70, over the electrode surface of the cathode 22. The second circular disk 56 is provided between the oxygen-containing gas channel 84 and the cathode 22. That is, when the oxygen-containing gas is supplied to the oxygen-containing gas pressure chamber 88, the second circular disk 56 tightly contacts the cathode 22 under pressure (see FIGS. 7 and 8).

Insulating seals 89a for sealing the fuel gas supply passage 36 and insulating seals 89b for sealing the oxygen-containing gas supply passage 50 are provided between the separators 28. For example, the insulating seals 89a, 89b are made of mica material, or ceramic material.

As shown in FIG. 1, the fuel cell stack 12 includes end plates 90a, 90b provided at opposite ends of the fuel cells 10 in the stacking direction. The end plate 90a or the end plate 90b are electrically insulated from tightening bolts 98. A first pipe 92 and a second pipe 94 extend through the end plate 90a. The first pipe 92 is connected to the fuel gas supply passage 36, and the second pipe 94 is connected to the oxygen-containing gas supply passage 50.

The end plates 90a, 90b have bolt holes 96 at positions above and under the fuel gas supply passage 36, and at positions above and under the oxygen-containing gas supply passage 50. Tightening bolts 98 are inserted into the respective bolt holes 96, and tip ends of the respective tightening bolts 98 are screwed into nuts 99 for tightening the fuel cell stack 12.

Next, operation of the fuel cell stack 12 will be described below.

As shown in FIG. 2, in assembling the fuel cell 10, firstly, the first plate 30 of the separator 28 is joined to one surface of the third plate 34, and the second plate 32 is joined to the other surface of the third plate 34. Thus, the third plate 34 divides a space in the separator 28 to form the fuel gas channel 76 connected to the fuel gas supply passage 36 and the oxygen-containing gas channel 84 connected to the oxygen-containing gas supply passage 50 separately (see FIGS. 3, and 7 to 9).

Figure 9:
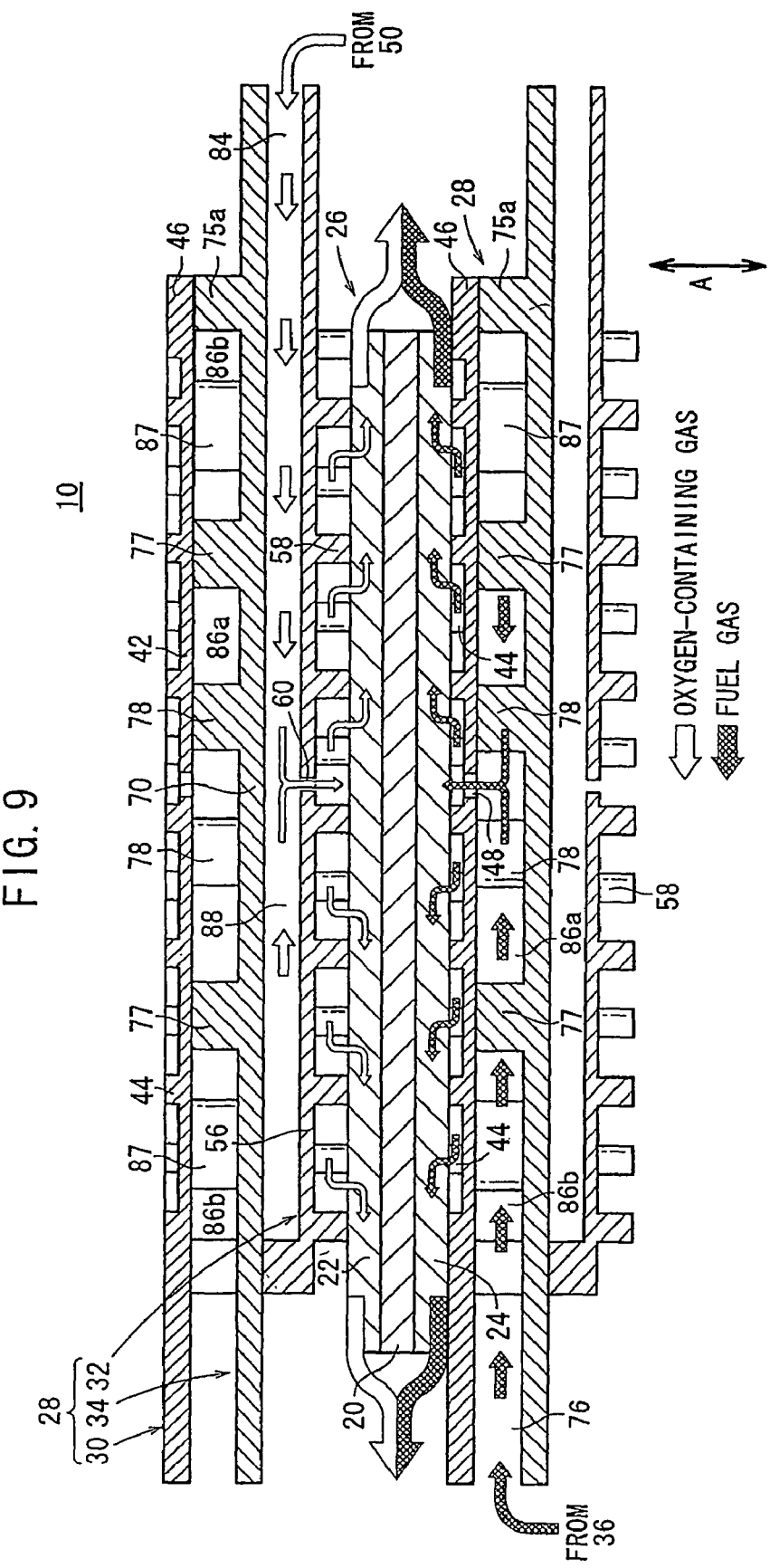
FIG. 9 is a cross sectional view schematically showing operation in the fuel cell.

Further, the fuel gas pressure chamber 86 is formed between the first and third circular disks 42, 70, and the oxygen-containing gas pressure chamber 88 is formed between the second and third circular disks 56, 70 (see FIG. 9).

Then, the separators 28 and the electrolyte electrode assemblies 26 are stacked alternately, and the end plates 90a, 90b are provided at the opposite ends in the stacking direction. The end plate 90a or the end plate 90b is electrically insulated from the tightening bolts 98. The tightening bolts 98 are inserted into the respective bolt holes 96 of the end plates 90a, 90b, and the tip ends of the tightening bolts 98 are screwed into the nuts 99 to form the fuel cell stack 12 (see FIG. 1).

A hydrocarbon fuel such as the city gas is supplied to the first pipe 92 connected to the end plate 90a, and flows from the first pipe 92 to the fuel gas supply passage 36. The oxygen-containing gas is supplied to the second pipe 94 connected to the end plate 90a, and the oxygen-containing gas (hereinafter also referred to as the "air") flows from the second pipe 94 to the oxygen-containing gas supply passage 50.

Figure 7:
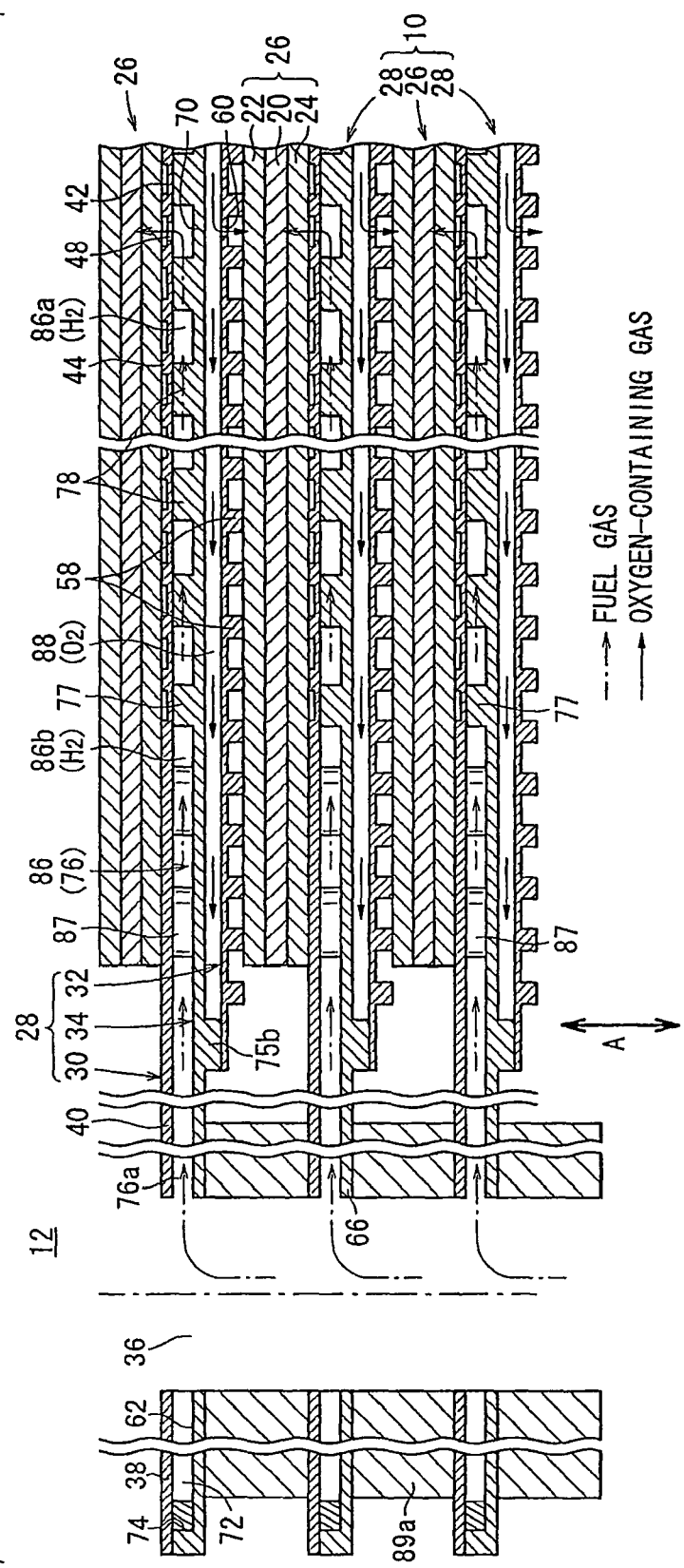
FIG. 7 is an enlarged cross sectional view showing the fuel cells at a position near a fuel gas supply passage.

As shown in FIG. 7, after the hydrocarbon fuel flows into the fuel gas supply passage 36, the hydrocarbon fuel flows in the stacking direction indicated by the arrow A, and is supplied to the fuel gas channel 76 in the separator 28 in each of the fuel cells 10. The hydrocarbon fuel flows along the fuel gas channel 76, and flows into the fuel gas pressure chamber 86 between the first and third circular disks 42, 70. The fuel gas pressure chamber 86 is divided into the inner pressure chamber 86a and the outer pressure chamber 86b by the arc-shaped walls 77. The predetermined arc-shaped wall 77 faces the fuel gas distribution passage 76a.

When the hydrocarbon flows through the fuel gas distribution passage 76a into the third circular disk 70, the hydrocarbon fuel is blocked by the predetermined arc-shaped wall 77. Therefore, the hydrocarbon fuel does not directly flow into the inner pressure chamber 86a. The hydrocarbon fuel temporarily flows into the outer pressure chamber 86b where pieces of the reforming catalyst 87 are present. By the reforming catalyst 87, the hydrocarbon fuel reacts with the water for performing steam reforming, and thus, a reformed gas (hereinafter also referred to as the "fuel gas") is produced.

Then, the reformed gas flows through the slits 77a between the arc-shaped walls 77 into the inner pressure chamber 86a. The reformed gas flows between the third protrusions 78 formed in the inner pressure chamber 86a, and flows into the fuel gas inlet 48 at the central position of the first circular disk 42.

The fuel gas inlet 48 is provided at a position corresponding to the central position of the anode 24 in each of the electrolyte electrode assemblies 26. Therefore, as shown in FIG. 9, the reformed gas from the fuel gas inlet 48 is supplied to the anode 24, and flows from the central region of the anode 24 to the outer circumferential region of the anode 24.

As shown in FIG. 8, after the oxygen-containing gas flows into the oxygen-containing gas supply passage 50, the oxygen-containing gas flows through the oxygen-containing gas channel 84 in the separator 28, and is supplied to the oxygen-containing gas pressure chamber 88 between the second and third circular disks 56, 70. The oxygen-containing gas flows into the oxygen-containing gas inlet 60 at the central position of the second circular disk 56.

The oxygen-containing gas inlet 60 is provided at a position corresponding to the central position of the cathode 22 in each of the electrolyte electrode assemblies 26. Therefore, as shown in FIG. 9, the oxygen-containing gas from the oxygen-containing gas inlet 60 is supplied to the cathode 22, and flows from the central region of the cathode 22 to the outer circumferential-region of the cathode 22.

Thus, in each of the electrolyte electrode assemblies 26, the fuel gas is supplied from the central region of the anode 24 to the outer circumferential region of the anode 24, and the oxygen-containing gas is supplied from the central region of the cathode 22 to the outer circumferential region of the cathode 22 for generating electricity. After the fuel gas and the oxygen-containing gas are consumed in the power generation, the fuel gas and the oxygen-containing gas are discharged as an exhaust gas from the outer circumferential regions of the first through third circular disks 42, 56, and 70.

In the first embodiment, the fuel gas pressure chamber 86 is divided into the inner pressure chamber 86a and the outer pressure chamber 86b by the arc-shaped walls 77, and pieces of the reforming catalyst 87 are provided in the outer pressure chamber 86b. Therefore, the power generation reaction (exothermic reaction) in the surface of the anode 24 and the internal reforming reaction (endothermic reaction) in the fuel gas pressure chamber 86 are performed, and the respective thermal reactions compensate with each other. Thus, the uniform temperature distribution in the separator 28 is achieved. It is possible to prevent generation of heat distortion in the separator 28 and the electrolyte electrode assembly 26.

An experiment was conducted in a first comparative example (in a case of direct reforming on the electrode), in a second comparative example (in a case of external reforming), and in the first embodiment according to the present invention. In the experiment, the temperature in the surface of the first circular disk 42 from the central position (corresponding to the fuel gas inlet 48) to the outermost position was detected. In the first comparative example, reforming reaction is performed by the anode 24 containing a nickel component. In the second comparative example, the hydrocarbon fuel is reformed externally, and the fuel gas produced by reforming is supplied into the anode 24.

Figure 10:
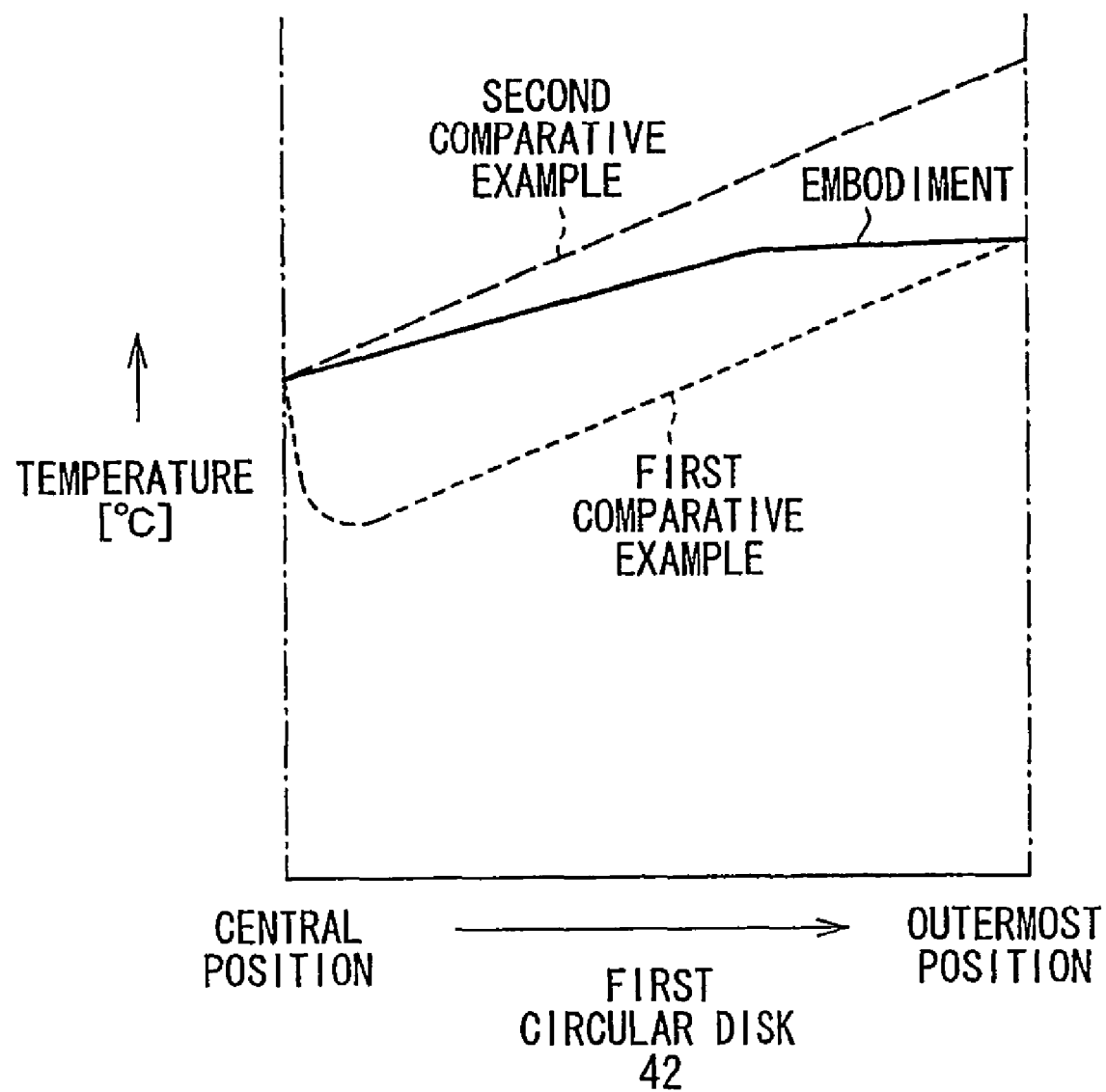
FIG. 10 is a graph illustrating the temperature from the central position to the outermost position of a first circular disk in each of the embodiment, a first comparative example, and a second comparative example.

Results of the experiment are shown in FIG. 10. In the first comparative example, reforming reaction occurred at the anode 24 when the hydrocarbon fuel was supplied from the central position of the first circular disk 42 to the anode 24. Therefore, by heat absorption in the endothermic reaction, the temperature in the central region of the anode 24 was decreased sharply. When the hydrocarbon fuel flowed outwardly, the fuel gas produced by reforming was used in the power generation reaction. Therefore, the temperature of the anode 24 was increased from the central side to the outer side of the anode 24. A sharp temperature gradient from the central side to the outer side was observed.

In the second comparative example, the fuel gas produced in the external reforming reaction was directly supplied into the anode 24. Therefore, at the anode 24, no reforming reaction occurred, and only the power generation reaction occurred. Thus, at the anode 24 and the first circular disk 42, the temperature was increased significantly by heat generation in the power generation reaction. Also in this case, a sharp temperature gradient was observed.

In contrast, in the embodiment, the reforming reaction occurred in the outer pressure chamber 86b between the first circular disk 42 and the third circular disk 70. The fuel gas produced in the reforming reaction was supplied into the anode 24 to induce power generation reaction (exothermic reaction). Thus, by the power generation reaction, though the outer side of the first circular disk 42 tends to have the highest temperature, since the heat generated by the power generation reaction was consumed by heat absorption by the reforming reaction in the outer pressure chamber 86b, the raise in the temperature near the outermost position in the first circular disk 42 was reduced. Further, since the fuel gas which has been produced beforehand by the reforming reaction in the outer pressure chamber 86b flowed toward the anode 24, the rapid reforming reaction or the sharp decrease in the temperature did not occur at the anode 24. Thus, heat generated in the exothermic reaction was consumed in the endothermic reaction. As a result, the temperature gradient from the central position to the outermost position of the first circular disk 42 was relatively small.

Thus, in the first embodiment, the uniform temperature distribution in the first circular disk 42 is achieved. Accordingly, it is possible to effectively prevent generation of heat distortion in the first circular disk 42 or the anode 24. In the fuel cell 10 and the fuel cell stack 12, the hydrocarbon fuel is sequentially reformed as it passes through the separators 28. Therefore, the fuel gas produced in the reforming reaction is supplied into the anodes 24 without requiring any additional passages. Accordingly, with the simple structure, it is possible to reduce the size of the fuel cell stack 12.

In the first embodiment, a plurality of arc-shaped walls 77 are formed as the partitions in the third circular disk 70 of the third plate 34. Alternatively, a plurality of arc-shaped walls (not shown) protruding toward the third plate 34 may be provided on the first circular disk 42 of the first plate 30. In the illustrated embodiment, the number of the arc-shaped walls 77 is four. However, the number of the arc-shaped walls 77 is not limited to four, and an arbitrary number of arc-shaped walls 77 may be used.

Figure 11:
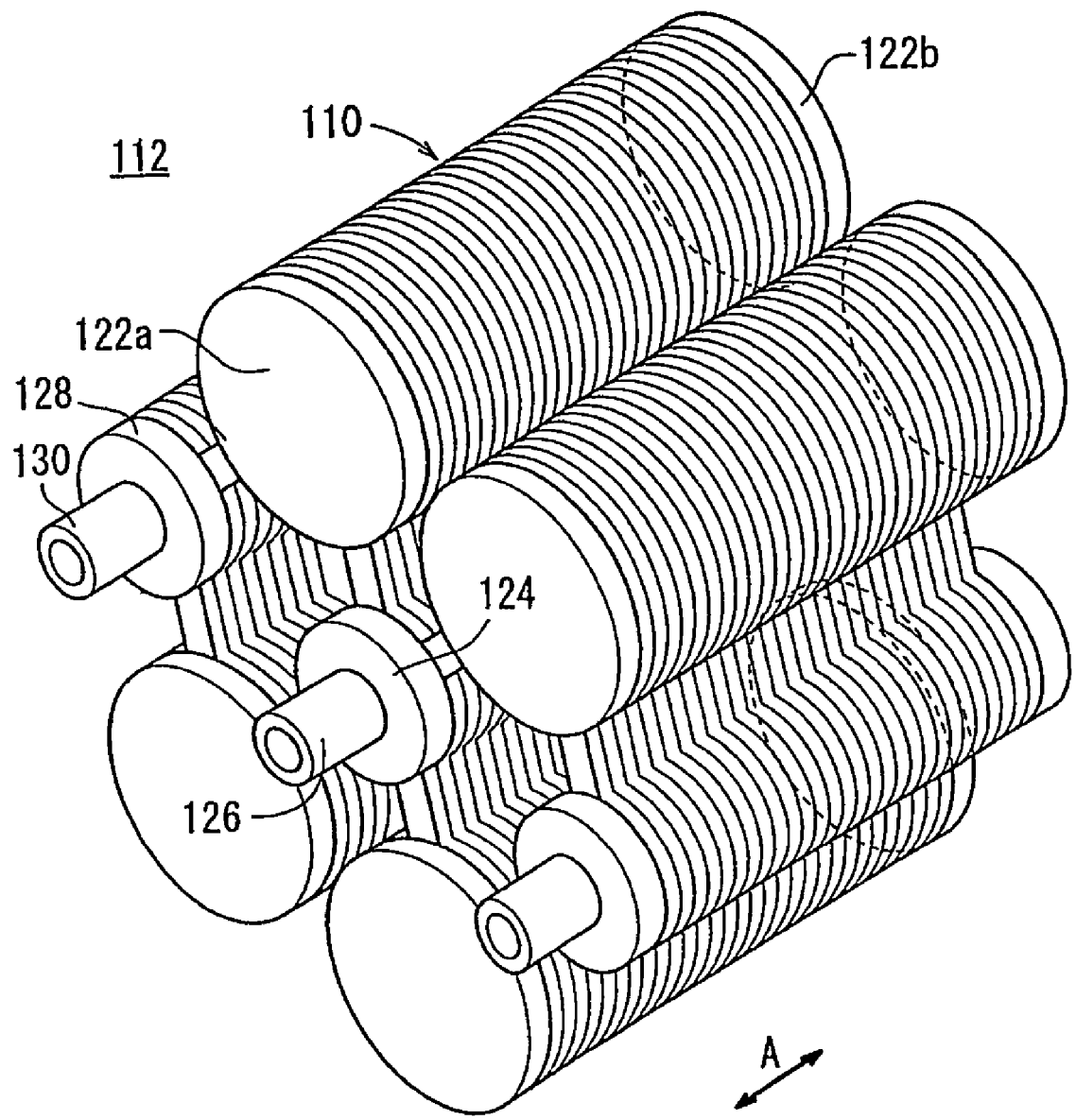
FIG. 11 is a perspective view schematically showing a fuel cell stack formed by stacking a plurality of fuel cells according to a second embodiment of the present invention.
Figure 12:
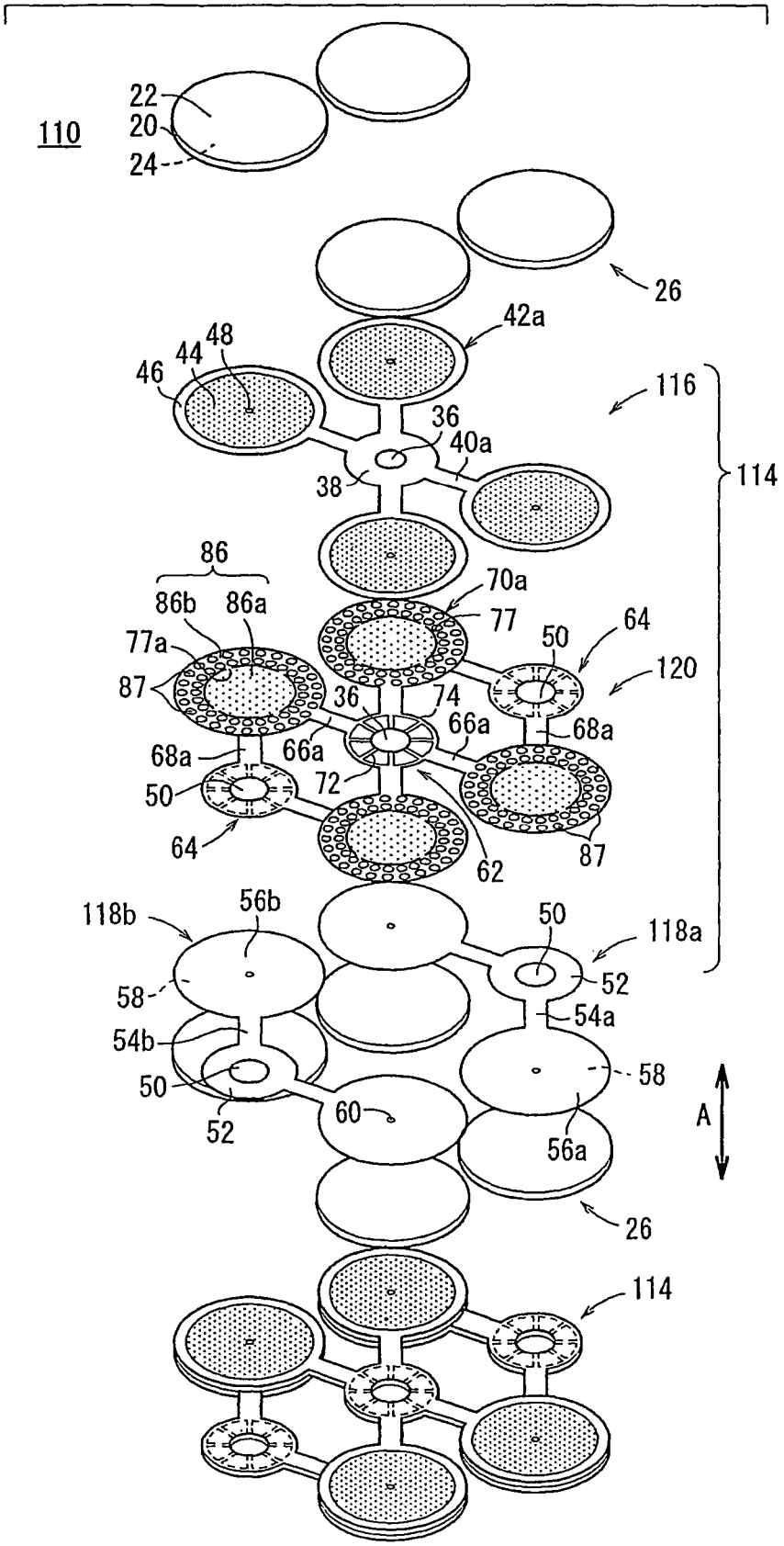
FIG. 12 is an exploded perspective view showing the fuel cell.

FIG. 11 is a perspective view schematically showing a fuel cell stack 112 formed by stacking a plurality of fuel cells 110 according to a second embodiment of the present invention in the direction indicated by an arrow A. FIG. 12 is an exploded perspective view showing the fuel cell 110. The constituent elements that are identical to those of the fuel cell 10 and the fuel cell stack 12 according to the first embodiment are labeled with the same reference numeral, and description thereof will be omitted.

Figure 13:
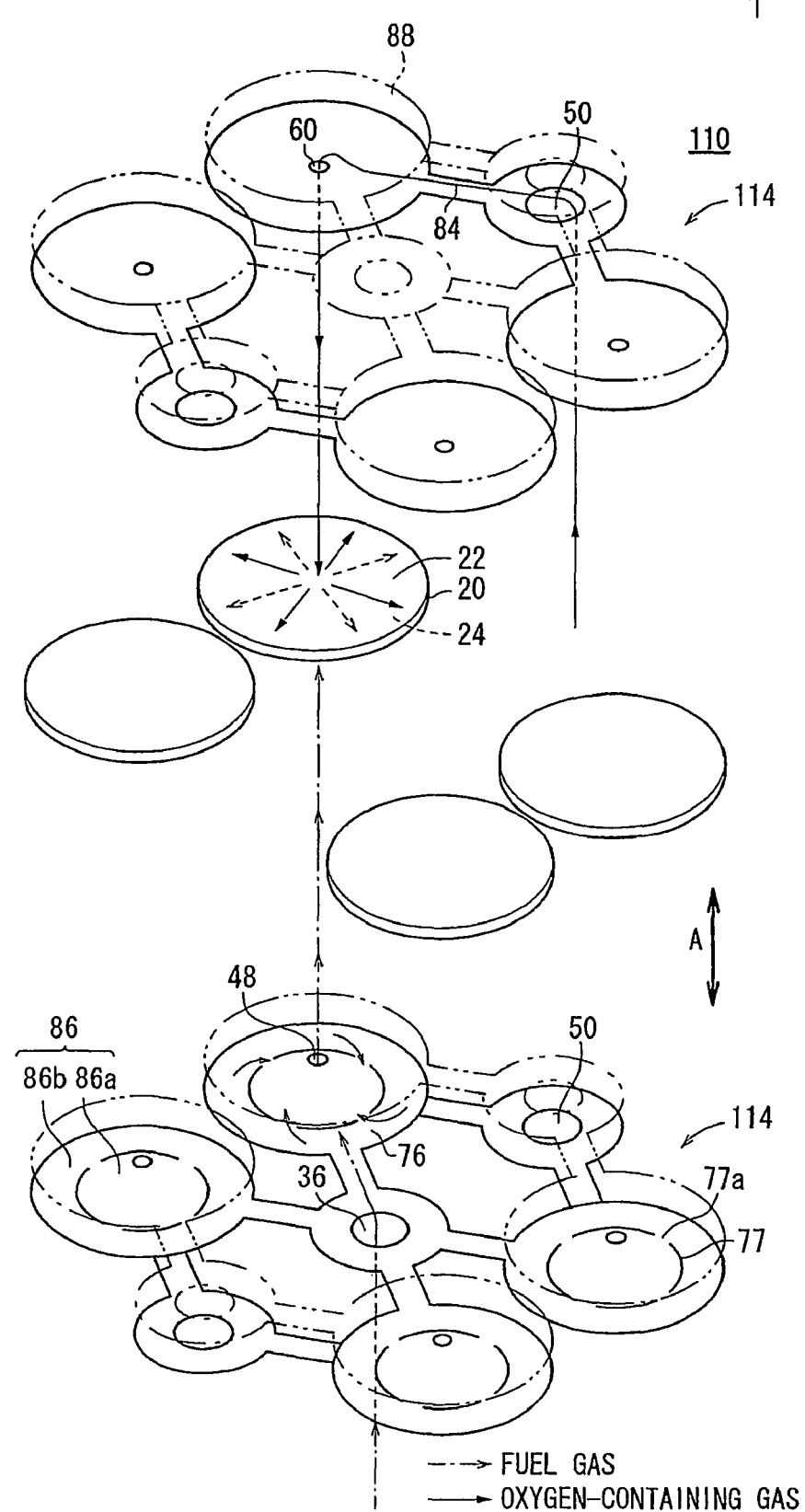
FIG. 13 is a partial exploded perspective view showing gas flows in the fuel cell.
Figure 14:
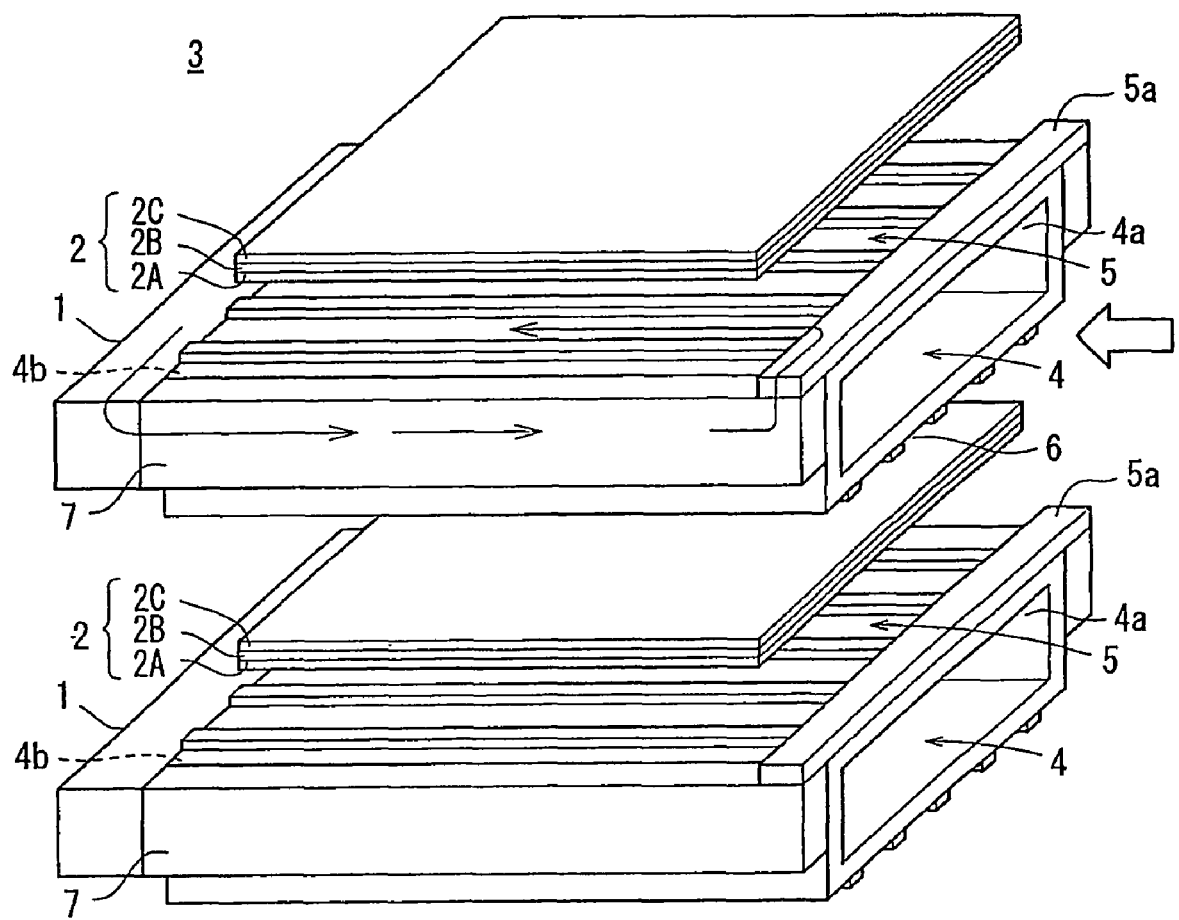
FIG. 14 is a perspective view schematically showing a conventional solid oxide fuel cell.

As shown in FIGS. 12 and 13, four electrolyte electrode assemblies 26 are sandwiched between the separators 114. Each of the separators 114 includes a first plate 116, a pair of second plates 118a, 118b, and a third plate 120. For example, the first to third plates 116, 118a, 118b, and 120 are metal plates of, e.g., stainless alloy. The first plate 116 and the second plates 118a, 118b are joined to both surfaces of the third plate 120 by brazing, for example.

The first plate 116 has a first small diameter end portion 38. A fuel gas supply passage 36 extends through the first small diameter end portion 38. The first small diameter end portion 38 is integral with four first circular disks 42a each having a relatively large diameter through four narrow bridges 40a.

The second plates 118a, 118b include second small diameter end portions 52, respectively. Oxygen-containing gas supply passages 50 extend through the second small diameter end portions 52, respectively. Each of the second small diameter end portions 52 is integral with two second circular disks 56a, 56b each having a relatively large diameter through two narrow bridges 54a, 54b.

The third plate 120 has a third small diameter end portion 62 and two fourth small diameter end portions 64. The oxygen-containing gas supply passages 50 extend through the fourth small diameter end portions 64, respectively. The third small diameter end portion 62 is integral with four third circular disks 70a each having a relatively large diameter through four narrow bridges 66a. Each of the fourth small diameter end portions 64 are integral with the third circular disks 70a through two narrow bridges 68a, i.e., the two fourth small diameter end portions 64 are integral with the four third circular disks 70a.

Fuel gas channels 76 are formed in the third circular disks 70a, respectively. Each of the fuel gas channels 76 forms a fuel gas pressure chamber 86 over the electrode surface of the anode 24 such that the first circular disk 42a of the first plate 116 is interposed between the fuel gas pressure chamber 86 and the anode 24. The fuel gas pressure chamber 86 is divided into an inner pressure chamber 86a and an outer pressure chamber 86b by arc-shaped walls 77. Pieces of reforming catalyst 87 are provided in the outer pressure chamber 86b.

As shown in FIG. 11, the fuel cell stack 112 includes four end plates 122a, 122b provided at opposite ends of the fuel cells 110. A plate 124 is provided at the position of the fuel gas supply passage 36. A pipe 126 for supplying the hydrocarbon fuel to the fuel gas supply passage 36 is connected to the plate 124. Two plates 128 are provided at the positions of the oxygen-containing gas supply passages 50. Pipes 130 for supplying the air are connected to the plates 128.

In the second embodiment, the hydrocarbon fuel is supplied to the fuel gas supply passage 36 in the fuel cell stack 112 through the pipe 126, and the air is supplied to the oxygen-containing gas supply passages 50 in the fuel cell stack 112 through the pipes 130.

The hydrocarbon fuel supplied to the fuel gas supply passage 36 flows in the stacking direction into the four fuel gas channels 76 in the separator 114 in each of the fuel cells 110. The hydrocarbon fuel flows along the fuel gas channels 76, and flows into the fuel gas pressure chambers 86 formed between the first and third circular disks 42a, 70a.

Thus, in each of the fuel gas pressure chambers 86, steam reforming is performed by the reforming catalyst 87 provided in the outer pressure chamber 86b. The reformed gas produced in the reforming reaction is supplied to the central positions of the respective anodes 24 of the electrolyte electrode assemblies 26 through the fuel gas inlets 48.

The air supplied to the two oxygen-containing gas supply passages 50 flows through the oxygen-containing gas channels 84 in the separator 114. Then, the air is supplied to the oxygen-containing gas pressure chambers 88 formed between the second and third circular disks 56a, 56b, 70a, 70b. The air flows into the central regions of the respective cathodes 22 of the electrolyte electrode assemblies 26 through the oxygen-containing gas inlets 60 provided at the central positions of the second circular disks 56a, 56b.

Thus, in the second embodiment, each of the fuel gas pressure chambers 86 formed between the first and third circular disks 42a, 70a is divided into the inner pressure chamber 86a and the outer pressure chamber 86b by the arc-shaped walls 77, and pieces of the reforming catalyst 87 are provided in the outer pressure chamber 86b. Therefore, the same advantages as in the case of the first embodiment can be achieved. For example, the uniform temperature distribution is achieved in the separator 114, and it is possible to prevent generation of heat distortion in the separator 114 or the electrolyte electrode assemblies 26.

INDUSTRIAL APPLICABILITY

According to the present invention, the fuel gas pressure chamber formed over the electrode surface of the anode is divided into a plurality of pressure chambers. The hydrocarbon fuel before consumption is reformed by the reforming catalyst provided in at least one pressure chamber to produce a reformed gas. Therefore, power generation reaction (exothermic reaction) is performed on the surface of the anode, and the internal reforming reaction (endothermic reaction) is performed in the fuel gas pressure chamber. Heat generated in the exothermic reaction is absorbed in the endothermic reaction to achieve the uniform temperature distribution in the separator. Thus, it is possible to effectively prevent generation of heat distortion in the separator and the electrolyte electrode assembly.

Further, the hydrocarbon fuel is sequentially reformed as it passes through the separators. It is possible to supply the fuel gas produced in the reforming reaction into the anodes without requiring any additional passages. Therefore, it is possible to simplify the structure, and reduce the size of the fuel cell or the fuel cell stack easily.

The invention claimed is:

1. A fuel cell comprising an electrolyte electrode assembly and a pair of separators sandwiching said electrolyte electrode assembly, said electrolyte electrode assembly including an anode, a cathode, and an electrolyte interposed between said anode and said cathode, wherein
   each of said separators includes first and second plates which are stacked together;
   an oxygen-containing gas channel for supplying an oxygen-containing gas to said cathode, and a fuel gas channel for supplying a fuel gas to said anode are formed between said first and second plates;
   said oxygen-containing gas channel forms an oxygen-containing gas pressure chamber over an electrode surface of said cathode such that said second plate is interposed between said oxygen-containing gas pressure chamber and said cathode, and said fuel gas channel forms a fuel gas pressure chamber over an electrode surface of said anode such that said first plate is interposed between said fuel gas pressure chamber and said anode;
   a third plate for dividing said fuel gas channel and said oxygen-containing gas channel is provided between said first and second plates;
   said fuel gas pressure chamber is divided into a plurality of pressure chambers by partitions; and
   reforming catalyst for reforming a hydrocarbon fuel before consumption to produce a fuel gas is provided in at least one of said divided pressure chambers.

2. A fuel cell according to claim 1, wherein said first plate has a fuel gas inlet for supplying the fuel gas from said fuel gas pressure chamber to a central region of said anode;
   said fuel gas pressure chamber is divided into an inner pressure chamber connected to said fuel gas inlet and an outer pressure chamber formed around said inner pressure chamber; and
   said reforming catalyst is provided in said outer pressure chamber.

3. A fuel cell according to claim 2, wherein said partitions have a slit connecting said inner pressure chamber and said outer pressure chamber.

4. A fuel cell according to claim 1, wherein said first and second plates include first and second protruding portions protruding in different directions;
   said first protruding portion include a plurality of protrusions in contact with an inner region of said anode and a substantially ring-shaped protrusion provided around said plurality of protrusions, and in contact with an outer region of said anode; and
   said outer pressure chamber is formed by the backside of said substantially ring-shaped protrusion and said partitions or the backside of said substantially ring-shaped protrusion, said partitions, and part of the backside of said plurality of protrusions.

5. A fuel cell according to claim 4, wherein said first and second protruding portions function as a current collector for collecting electrical energy generated in said electrolyte electrode assembly.

6. A fuel cell according to claim 1, wherein a fuel gas distribution passage connecting a fuel gas supply passage and said fuel gas channel is formed between said first and third plates for supplying the fuel gas before consumption in the stacking direction of said electrolyte electrode assembly and said separators; and
   an oxygen-containing gas distribution passage connecting an oxygen-containing gas supply passage and said oxygen-containing gas channel is formed between said second and third plates for supplying the oxygen-containing gas before consumption in the stacking direction.

7. A fuel cell stack including a plurality of fuel cells stacked together in a stacking direction and end plates provided at opposite ends of said fuel cells in the stacking direction, said fuel cells each comprising an electrolyte electrode assembly and a pair of separators sandwiching said electrolyte electrode assembly, said electrolyte electrode assembly including an anode, a cathode, and an electrolyte interposed between said anode and said cathode, wherein
   each of said separators includes first and second plates which are stacked together;
   an oxygen-containing gas channel for supplying an oxygen-containing gas to said cathode, and a fuel gas channel for supplying a fuel gas to said anode are formed between said first and second plates;
   said oxygen-containing gas channel forms an oxygen-containing gas pressure chamber over an electrode surface of said cathode such that said second plate is interposed between said oxygen-containing gas pressure chamber and said cathode, and said fuel gas channel forms a fuel gas pressure chamber over an electrode surface of said anode such that said first plate is interposed between said fuel gas pressure chamber and said anode;
   a third plate for dividing said fuel gas channel and said oxygen-containing gas channel is provided between said first and second plates;
   said fuel gas pressure chamber is divided into a plurality of pressure chambers by partitions; and
   reforming catalyst for reforming a hydrocarbon fuel before consumption to produce a fuel gas is provided in at least one of said divided pressure chambers.

* * * * *